(12) United States Patent
Cavalieri Foschini et al.

(10) Patent No.: US 9,517,893 B2
(45) Date of Patent: Dec. 13, 2016

(54) METHOD AND DEVICE FOR FEEDING PRODUCTS TO A PROCESSING STATION

(71) Applicant: Fabio Perini Packaging S.p.A., Bologna (IT)

(72) Inventors: Luca Cavalieri Foschini, Granarolo dell'Emilia (IT); Gabriele Canini, San Giorgio di Piano (IT); Valter Di Nardo, Capannori (IT)

(73) Assignee: Fabio Perini Packaging S.p.A., Lucca (IT)

( * ) Notice: Subject to any disclaimer, the term of this patent is extended or adjusted under 35 U.S.C. 154(b) by 278 days.

(21) Appl. No.: 14/349,608

(22) PCT Filed: Oct. 3, 2012

(86) PCT No.: PCT/IB2012/055281
§ 371 (c)(1),
(2) Date: Apr. 3, 2014

(87) PCT Pub. No.: WO2013/050932
PCT Pub. Date: Apr. 11, 2013

(65) Prior Publication Data
US 2014/0297025 A1    Oct. 2, 2014

(30) Foreign Application Priority Data
Oct. 7, 2011 (IT) .................. FI2011A0218

(51) Int. Cl.
G06F 7/00 (2006.01)
B65G 43/00 (2006.01)
B65G 43/08 (2006.01)
B65G 47/08 (2006.01)

(52) U.S. Cl.
CPC ............. *B65G 43/00* (2013.01); *B65G 43/08* (2013.01); *B65G 47/082* (2013.01)

(58) Field of Classification Search
USPC ........................................................... 700/229
See application file for complete search history.

(56) References Cited

U.S. PATENT DOCUMENTS

| | | | |
|---|---|---|---|
| 5,097,939 A | 3/1992 | Shanklin | |
| 5,881,860 A * | 3/1999 | Zecchi | B65G 47/847 198/464.3 |

FOREIGN PATENT DOCUMENTS

| | | | | |
|---|---|---|---|---|
| DE | 4002724 A1 * | 8/1991 | ........... | B65G 47/082 |
| EP | 0757960 A1 | 2/1997 | | |
| GB | 2011850 A | 7/1979 | | |

(Continued)

*Primary Examiner* — Kyle Logan
(74) *Attorney, Agent, or Firm* — Breiner & Breiner, L.L.C.

(57) ABSTRACT

A device for launching products into a feeding path, including a launcher; a detection sensor to detect the passage of products launched by the launcher; a launcher central control unit; conveyors to move forward the products in the feeding path, associated with a drive member; and at least one movement sensor to detect the position of the products moved by the conveyors. The central control unit is programmed to control the start position taken by each group of products, downstream of the detection sensor, and to impose on each group of products a forward movement according to the length of the group of products and to an adjustment factor determined by the error, if any, between the detected start position and a desired start position.

42 Claims, 12 Drawing Sheets

STATE OF THE ART

(56) References Cited

FOREIGN PATENT DOCUMENTS

JP          61-178316  A    8/1986
WO        2007144921 A2   12/2007

* cited by examiner

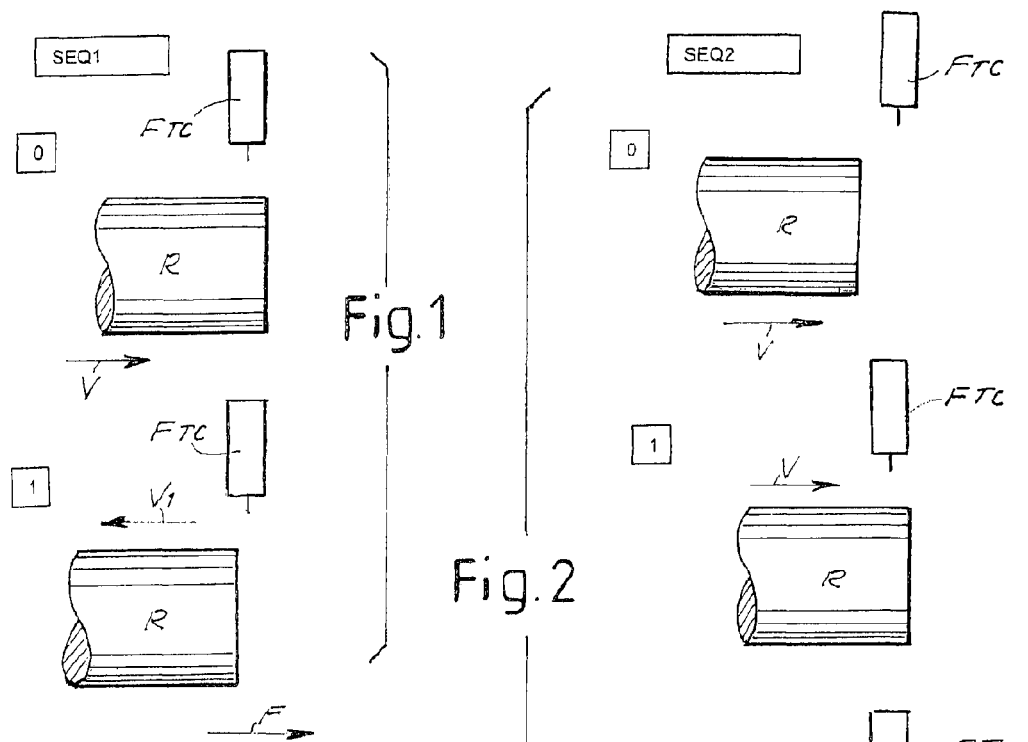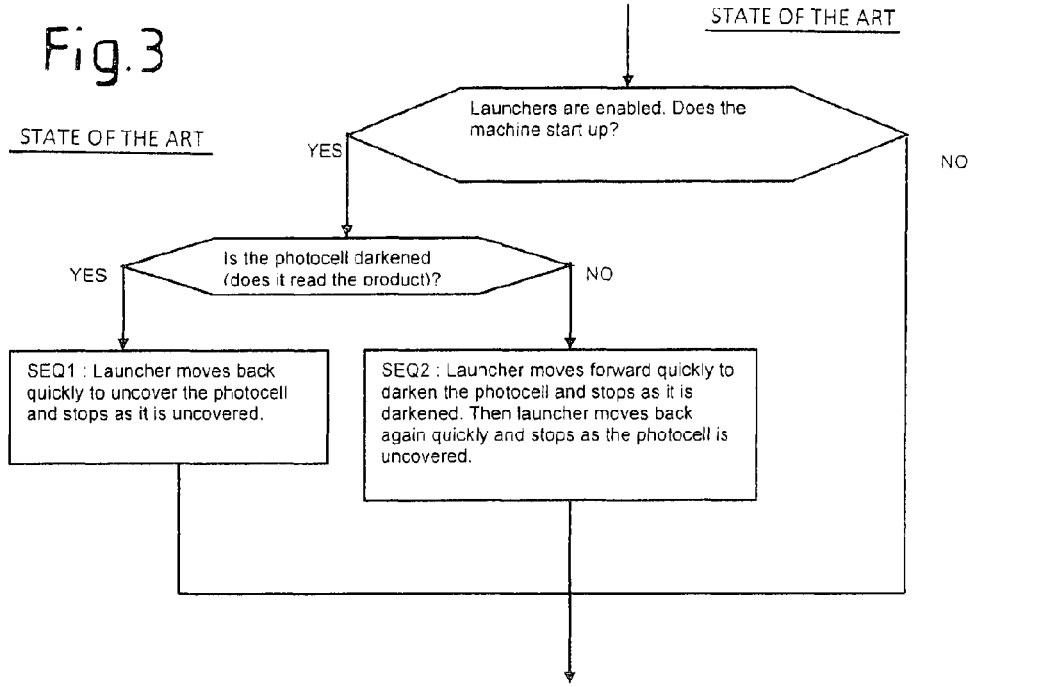

STATE OF THE ART

STATE OF THE ART

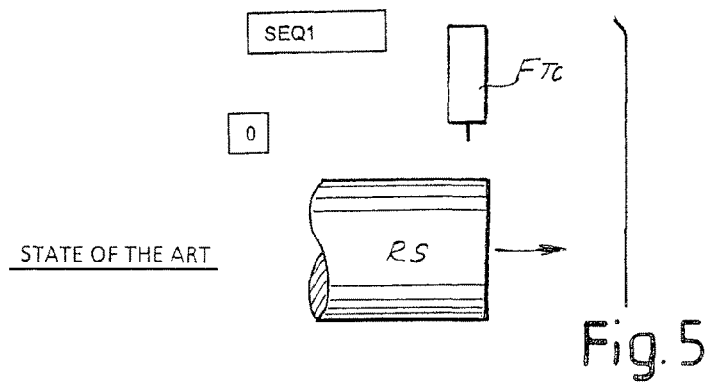
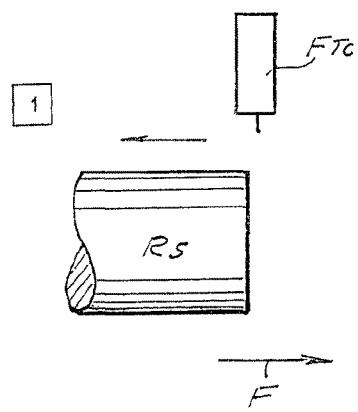
Fig. 5
STATE OF THE ART
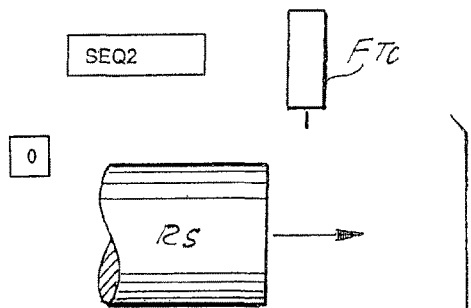
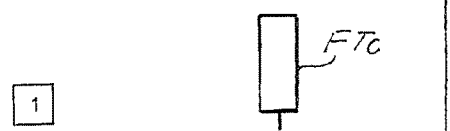
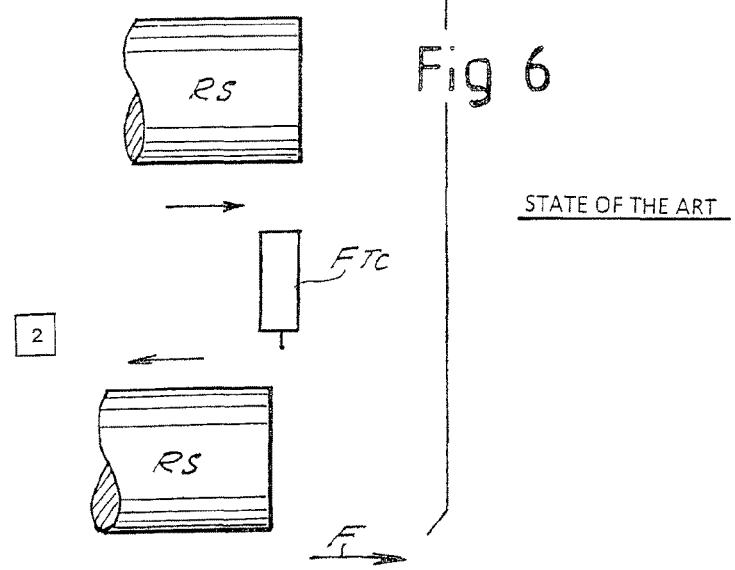
Fig 6
STATE OF THE ART

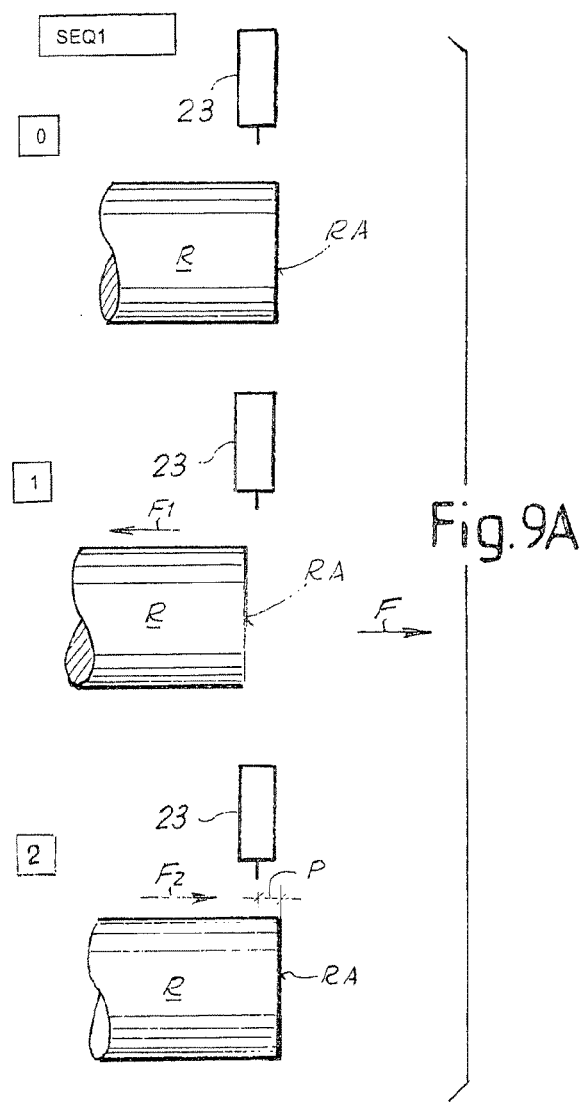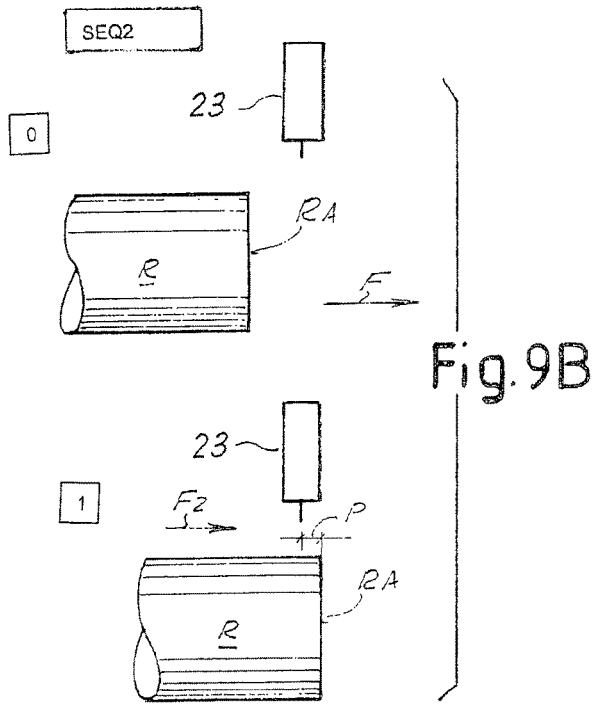

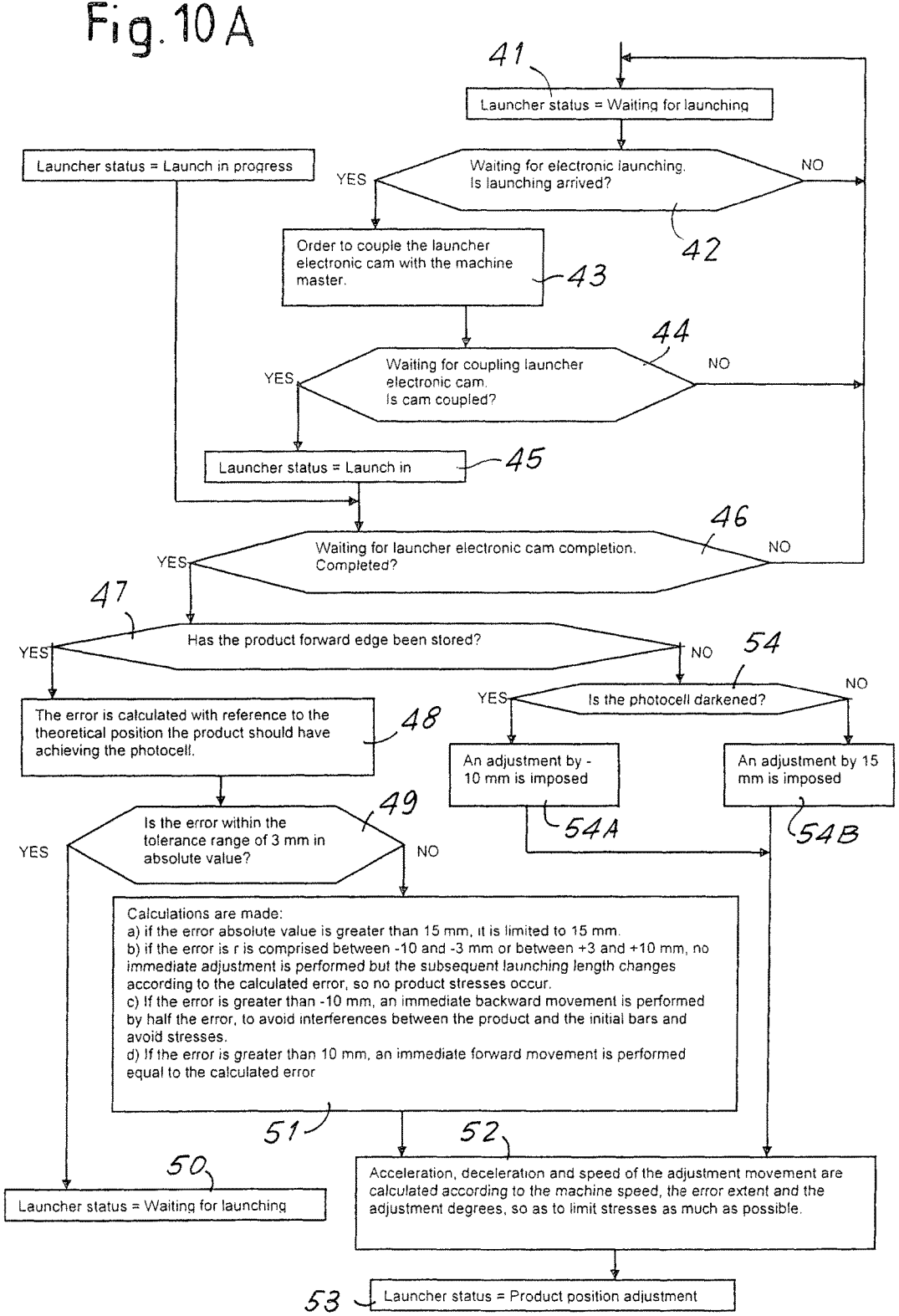

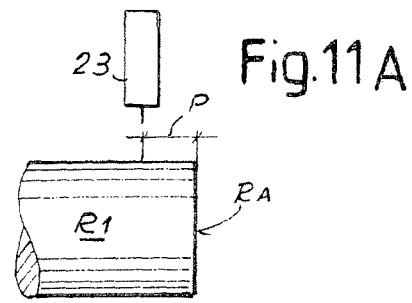
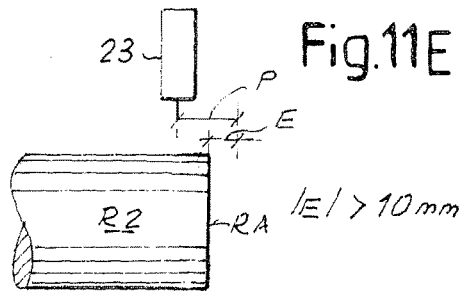
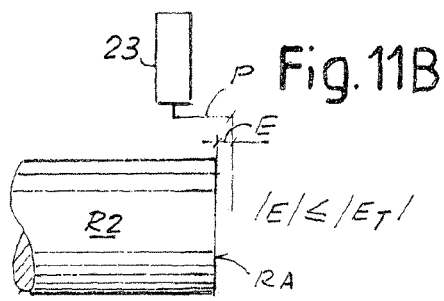
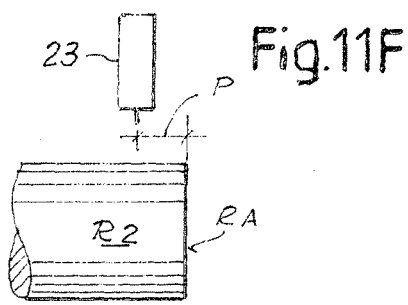
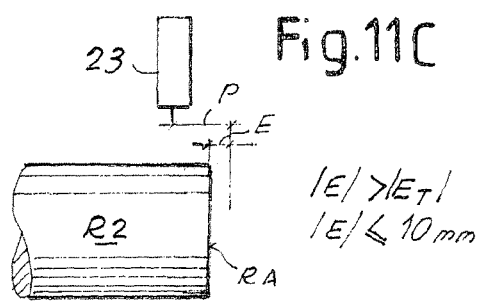
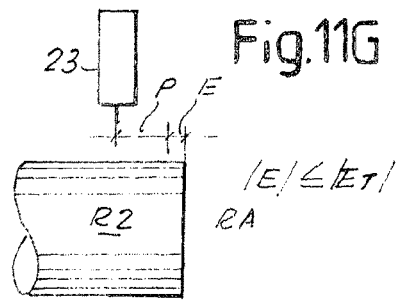
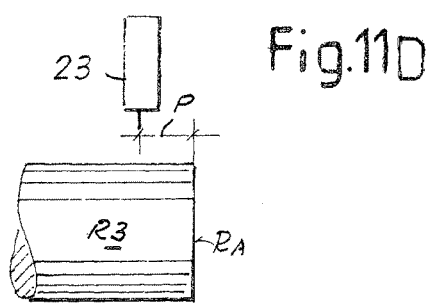

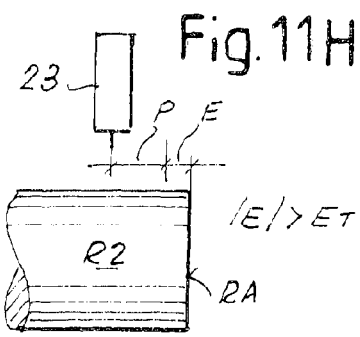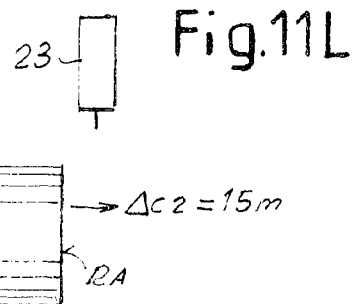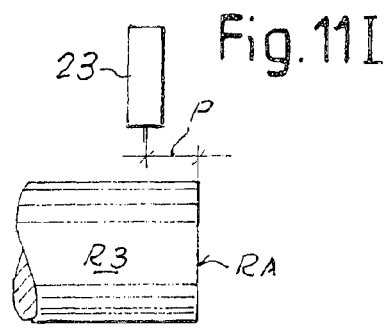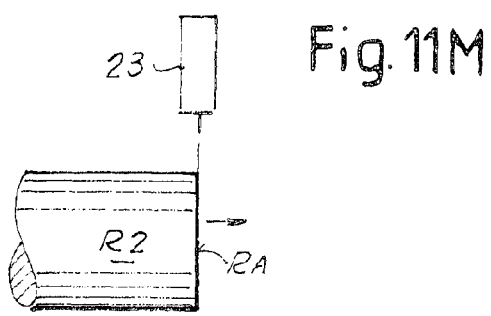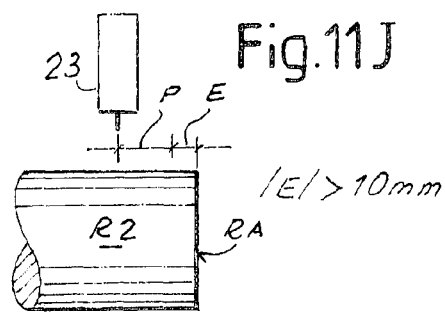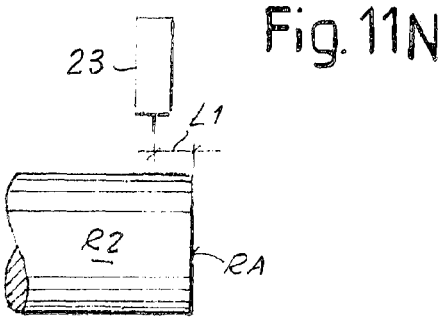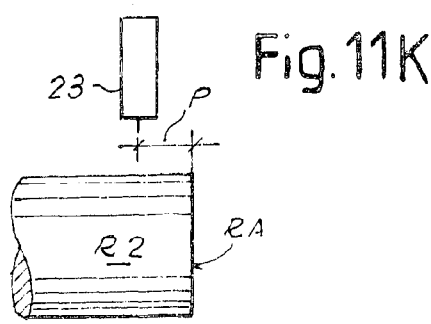

METHOD AND DEVICE FOR FEEDING PRODUCTS TO A PROCESSING STATION

TECHNICAL FIELD

The present invention relates to methods and devices for feeding products, e.g. in a packaging line or the like. More in particular, the present invention relates to methods for feeding sequenced products along a feeding path in a paced and controlled manner.

STATE OF THE ART

Numerous industrial applications require feeding products from a production line in a feeding path towards a downstream station. The products shall be fed in a controlled and paced manner, so that they can be grouped, if necessary, and further processed or packaged.

In particular in the field of toilet paper production or the like, the rolls from the winding and cutting line shall be grouped and fed into a packaging machine. WO-A-2007/144921 discloses a machine used for producing packaging rolls of toilet paper, kitchen paper or the like.

This kind of machines provides for one or more feeding channels, arranged side by side and substantially parallel to one another, along which so-called "launchers" are arranged, i.e. members "launching" the products, in a controlled manner, in a feeding path towards the packaging machine. The products shall be fed by the launchers in a paced and controlled manner, so as to be arranged according to a desired configuration for being subsequently packaged.

Correctly positioning each product before launching it in the feeding path is critical to handling these products.

FIGS. 1 to 6 schematically show the method currently used for these operations. More in particular, FIG. 1 shows a block diagram describing the positioning of the first product when the machine begins working. Particular reference will be made below to feeding rolls of toilet paper, kitchen paper or other rolls in tissue paper or the like; it should be however understood that the same method can be also used for handling different products.

The process for positioning the first product or roll is the following. The roll, indicated in FIGS. 1 and 2 with R, advances under a photocell FTC until its leading edge, with respect to the feeding direction V, is detected by said photocell FTC. At this point, the movement of the roll R according to arrow V is stopped and reversed, so that the roll moves backwards until uncovering the photocell FTC.

This motion is stopped as the photocell FTC has been uncovered, i.e. it no longer detects the presence of the roll R in front of it. Thus, the roll R achieves the final position in FIG. 1, which is the start position for the subsequent feeding sequence.

The described sequence is performed when the photocell FTC detects the roll R at the machine start-up. On the contrary, as shown in FIG. 2, if the photocell FTC does not detect the roll R at the machine start-up, the roll is moved forwards according to arrow V until reaching the photocell FTC. Once the roll R has been detected by the photocell, its movement is stopped and reversed according to arrow V1, i.e. the direction opposite the feeding direction F towards the downstream machine, until the photocell FTC detects the passage of the roll front edge, i.e. until it is uncovered. The final position in FIG. 2 is thus achieved: the roll R is now positioned with respect to the photocell FTC in the same way as in FIG. 1. This is the start position for feeding the rolls.

The block diagram of FIG. 3 schematically shows the process described above. SEQ1 and SEQ2 indicate the sequences of FIG. 1 and of FIG. 2 respectively.

In both the situations described above for FIGS. 1 and 2, a backward movement (V1) of the first roll R is entailed in initially positioning said first roll R of the series of rolls to be fed in the feeding path. Upstream of said roll there is a row of similar products arranged side by side, and the backward movement causes therefore an alteration affecting all the row of products waiting along the path upstream of the photocell FTC; this situation could result in the products being damaged and overturned.

FIGS. 4A and 4B show a functional block diagram of the launch of single rolls into the feeding path according to the prior art method. The first block in FIG. 4A represents the launcher waiting for launching a roll into the feeding path downstream of the photocell FTC. When the central control unit orders the launch of a roll, the launcher performs a product launching cycle, defined by an electronic cam of the same launcher. The term "electronic cam" simply refers to the electronic definition of a displacement and of the corresponding equation of motion (motion as a function of time). When the launching movement ends, the roll initially held by the launcher has been inserted in the feeding path downstream of the photocell FTC; it is now necessary to adjust the position of the subsequent roll. The subsequent roll is indicated with RS in FIGS. 5 and 6, wherein two alternative sequences for adjusting the position of the roll RS are shown, the position adjustment sequence being defined by the block diagram of FIG. 4B. As it is clearly apparent by comparing FIG. 3 and FIG. 4B, substantially the same procedure illustrated with reference to FIGS. 1 and 2, and summarized in FIGS. 5 and 6, applies for adjusting the position of the subsequent roll RS with respect to the photocell FTC. The adjusting sequence SEQ1, schematically shown in FIG. 5, is applied when, as a result of the launch of the roll R, the subsequent roll RS is now in such a position that its leading edge, i.e. the forward edge, is beyond the photocell FTC with respect to the product feeding direction F. The launcher is actuated to back the roll RS until to uncover the photocell FTC. Contrariwise, if the subsequent roll RS has not been detected by the photocell FTC (FIG. 6), the launcher is actuated firstly to move the roll RS forward until it achieves the photocell FTC, and then to reverse the motion so as to back the roll RS again until it achieves the final position illustrated in the sequence of FIG. 6 (SEQ2). In both the cases (FIGS. 5 and 6), positioning the subsequent roll RS, i.e. that following the roll just launched, entails a backward movement of the roll RS towards the upstream rolls. These latter are continuously pushed forwards by the upstream conveyors; the positioning of each roll results therefore in the upstream rolls being pushed backwards, against the action of the conveyors tending to move them forwards. This backward movement of the rolls, repeated every time a new roll is launched in the path towards the packaging machine, involves the risk of damaging the product and overturning it along the line upstream of the photocell FTC.

The launcher launches each roll forwards by a length equal to the roll length plus a quantity preset by the operator, to balance the roll backward movement with respect to the photocell position, due to delays in reading and to deceleration up to stop. The preset quantity does not take account of the real position actually achieved by the roll moving backwards until it stops. In managing the products, the traditional systems do not take into account the real position thereof, basing it only on the photocell signal. When the first product is moved backward, as the photocell is uncovered, i.e. as the product leading edge is upstream of the photocell and uncovers it, the backward movement is stopped, and the positioned product can be launched.

The traditional method described above may be also used to launch several products together, abutting one against the other. The method does not change; it requires only a greater length of the launch, equal to the length of the single product multiplied by the number of products to be launched at each cycle.

SUMMARY OF THE INVENTION

According to one aspect, the object of the invention is to provide a method and a device for feeding products in a feeding path in a controlled manner, which completely or partially overcomes one or more of the prior art drawbacks described above.

The method according to the invention is substantially based upon the idea of detecting the position achieved by the product or by the group of products with respect to a reference point. The reference point is defined by a detection sensor. The detection sensor may advantageously be a photocell. The product position to be detected is advantageously defined by the position of the front edge, i.e. of the leading edge (with respect to the feeding direction) of the leading product of a group. Practically, according to the method, each group of products (that may be also formed by only one product) is positioned in a detectable position, and is launched, i.e. fed towards and into the feeding path, based on said position. A desired start position is preferably defined, in which each group of products should be positioned and from which it should be launched into the feeding path. In some embodiments, according to the method of the invention, if the detected start position, i.e. the position in which the group of products to be launched in the subsequent cycle has been brought, corresponds to the desired start position, within a tolerance range, if necessary, then the subsequent launch is performed moving the group of products forwards in the feeding direction by a length corresponding to the dimension (length) of said group of products. Contrarily, if the detected start position of the group of products does not correspond to the desired start position, the subsequent movement of the products shall be modified according to the detected error, so as to keep the error, i.e. the difference between the desired start position and the actual position of the products, within a tolerance range or threshold.

In some advantageous embodiments according to the method there may be a step of spacing from each other the single products to be launched in each cycle, for instance by accelerating each product, so as to facilitate the detection of the initial and/or final edges of the single products by means of the launcher sensor.

Different procedures for adjusting the detected start position according to the extent and the sign of the detected error will be described below.

According to advantageous embodiments of the invention, the position from which each group of products is launched is practically arranged downstream of the detection sensor and is detected based upon the signal from the detection sensor and a movement sensor. Typically, the movement sensor is an encoder, for instance an encoder associated with a motor controlling the movement of the launcher conveyors. The actual position in which the front edge (i.e. the leading edge) of a product or group of products is detected for instance based upon the movement detected by the movement sensor associated with the launcher after that the detection sensor has read the front edge of the product or group of products. The detection sensor practically reads the passage of the front edge and the movement sensor detects the extent of the forward movement of the product or group of products from then on, thus identifying the position in which the front edge stops downstream of the detection sensor. The front edge is substantially "tracks" by the movement sensor. The movement sensor substantially detects the movement of a conveyor into contact with the product, assuming that there is no slipping between the conveyor and the product, at least during this detection step.

According to one embodiment, a method is therefore provided for feeding products into a feeding path, comprising the steps of: moving forward a product according to a feeding direction beyond the detection sensor (i.e. downstream thereof with respect to the feeding direction) towards a detected start position; and, through a launcher, launching a group of products from the detected start position into said feeding path, moving forward the group of products according to the detected start position and to a preset length of products. The method may comprise a step of detecting an error between a desired start position and a detected start position, and a step of adjusting said error if it exceeds a threshold value.

As it will be clearly apparent from the detailed description below of some embodiments, the method described herein generally allows a regular forward movement of the products, without, or almost without, the need for a backward movement of the products. Each launching cycle starts, in fact, from a position of the front edge of the leading product of the group of products to be launched, which is arranged downstream of the detection sensor. The launch occurs imposing such a forward movement as to bring the leading edge of the subsequent group of products again downstream of the sensor. Each launching cycle therefore occurs without the need for moving the products backwards upstream of the launcher, unless the error is glaring. As it will be better explained below, in this case again procedures can be applied to limit the drawbacks resulting from said backward movement.

In advantageous embodiments, the detected start position is compared with a desired start position, at a preset distance downward of the detection sensor; and the launcher is controlled so as to impose on said group of products a forward movement corresponding to the preset length of products adjusted according to an error between the desired start position and the detected start position.

In practical embodiments, the method comprises the steps of:

feeding a product flow into said launcher, said products being adjacent to each other to form a continuous series;

launching a group of one or more products from said launcher every time said group of products is required in the feeding path, detecting the actual position where the first product following the launched product or group of products stops, calculating a positioning error, if any, and verifying whether said positioning error is within a tolerance range;

if necessary, adjusting the launch of the subsequent product or group of products to limit said positioning error.

The group of products may comprise a single product; in this case the preset length of products corresponds to the length of one product. Vice versa, the group of products may comprise a plurality of subsequent products aligned along the feeding direction; in this case the preset length of products corresponds to the sum of the lengths of said plurality of products. "Length" means the dimension of the product or group of products in the feeding direction. All the products may be equal to one another; in some embodiments it is however also possible that in the sequence of products to be fed there are products of different lengths, arranged according to a given and repetitive pattern.

In some embodiments when a product feeding cycle starts, a first group of products is arranged with a leading edge thereof, relative to the feeding direction, in the desired start position downward of the detection sensor. The first group of products and the subsequent groups of products are launched in succession into the feeding path, imposing a forward movement on each group of products according to the preset length of products, starting from the detected start position. In case of error in the positioning of the groups of products following the first one, the forward movement is adjusted. A tolerance range may be provided, performing the adjustment only if the detected start position differs from the desired start position by more than the tolerance threshold.

In some embodiments, after having launched a first group of products, the passage of the leading edge of a second group of products is detected through the detection sensor, and the error, if any, is detected between the detected start position taken by the leading edge of said second group of products and the desired start position of said second group of products. An adjusting sequence is set according to the extent and the sign of the detected error.

In some embodiments, if the positioning error between the desired start position and the detected start position of the group of products exceeds the error threshold, but is below a maximum intervention threshold, the adjustment is performed during the product launch so as to affect the subsequent group of products. The adjustment may be either imposed on the group of products being launched or subdivided and distributed on more subsequent groups.

If the detected error exceeds this maximum intervention threshold, it is possible to perform the adjustment immediately; this means that the group of products waiting for the launch and incorrectly positioned is moved forward or backward by a certain extent to adjust or reduce the positioning error. In this way the adjustment may be distributed, if necessary, on sequential groups of products, and it is therefore not necessary excessively to change the movement of the group of rolls with respect to the theoretical movement it should have if correctly positioned.

In advantageous embodiments the groups of products are spaced one from the other. In this way the backward edge (i.e. the last edge with respect to the feeding direction) of the last product of a first group of products is spaced from the front edge (i.e. the leading edge with respect to the feeding direction) of the first product of a subsequent group of products. The detection sensor can therefore correctly detect the passage of the front edge of the second group of products and the central unit can identify, through the movement sensor, the stop point, i.e. the detected start position taken by the leading or front edge of the second group of products. If the leading edge of the second group of products is not detected, for instance because the two subsequent groups of products have not been spaced, according to the method an adjusting sequence is provided to obtain anyway a correct re-positioning of the groups of products.

According to another aspect the invention relates to a device for launching products into a feeding path, comprising: a launcher; a detection sensor to detect the passage of products launched by said launcher; a central control unit of the launcher; conveyors to move forward the products in said feeding path, associated with a drive member; and at least one movement sensor to detect the position of the products moved by said conveyors. The central control unit is programmed to perform a method as described above.

As it will be clearly apparent from the detailed description below of an embodiment of the invention, the method according to the invention allows greatly limiting the backward movements of the product row fed to the launcher. In fact, according to the prior art all the product raw upstream of the detection sensor is pushed back by a certain extent at every launching cycle, as this is necessary to define the start position of each group of products, whereas, according to the method of the invention, the backward movement of the products is imposed only in exceptional cases, i.e. only when given positioning errors occur. If the detected start position is too much advanced with respect to the theoretical position, i.e. to the desired position, and the detected error exceeds a given threshold, the group of products to be launched, and therefore also the products upstream thereof, are moved backward. The backward movement is preferably equal to a fraction of the actual detected error. In other circumstances, even if the group of products is too much advanced, provided that this positioning error is below a threshold value, the adjustment is made by acting on the launch length of the group of incorrectly positioned products, without the need to move the products back.

From a macroscopic viewpoint, this results in a much more uniform product flow, almost without reverse movements with respect to the feeding direction. Therefore, the stress on the upstream products and the risk of an overturning thereof greatly decrease.

BRIEF DESCRIPTION OF THE DRAWINGS

The invention will be better understood by following the description below and the attached drawing, which shows a practical embodiment of the group according to the invention. More in particular, in the drawing:

FIGS. 1 to 6, that have been already described, show the product launch method according to the prior art;

FIGS. 9A and 9B show two alternative sequences for positioning the product according to the process represented in the block diagram of FIG. 8;

FIGS. 10A and 10B show a block diagram of a generic launch step and of the subsequent adjustments, if any, of the position of the roll following the launched roll;

DETAILED DESCRIPTION OF AN EMBODIMENT

The invention will be described below with specific reference to the handling of rolls of tissue paper, for instance toilet paper or kitchen paper. It should be however understood that the invention can be applied for handling all kinds of products, where similar handling problems arise for launching the products in sequence towards a feeding path by means of a launcher as illustrated below.

Figure 4A:
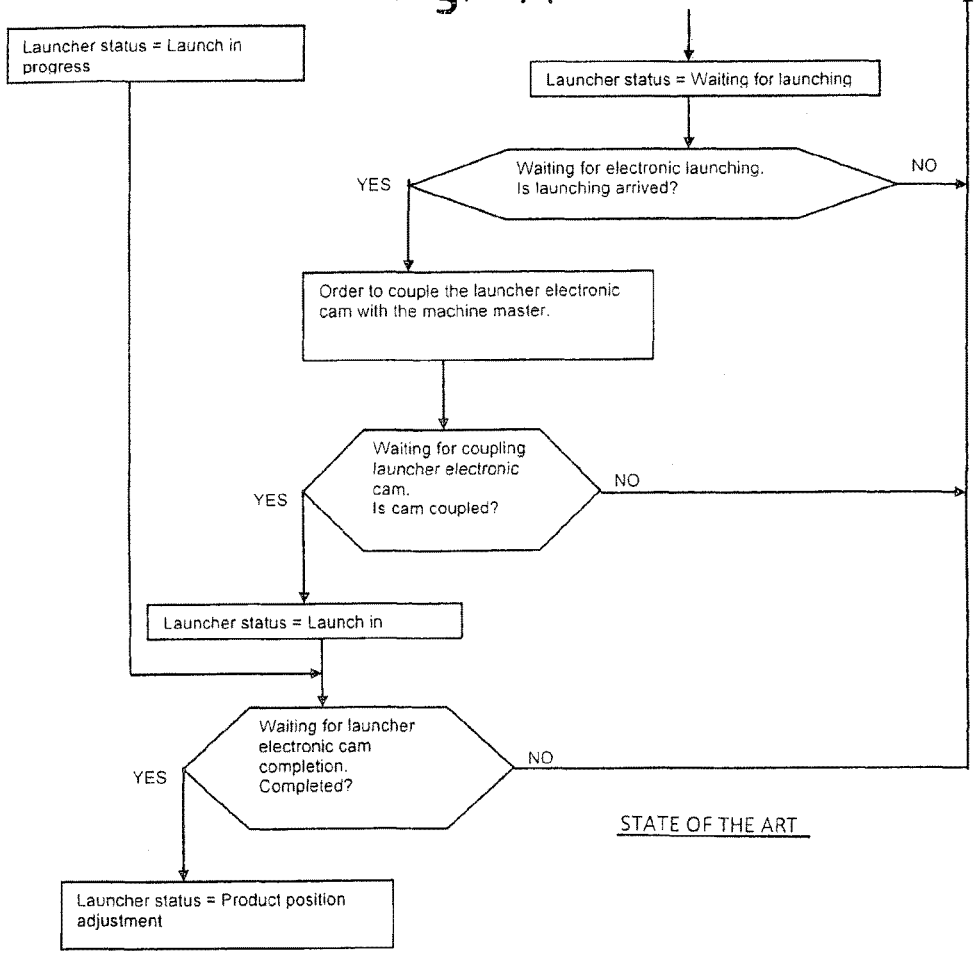
Figure 4B:
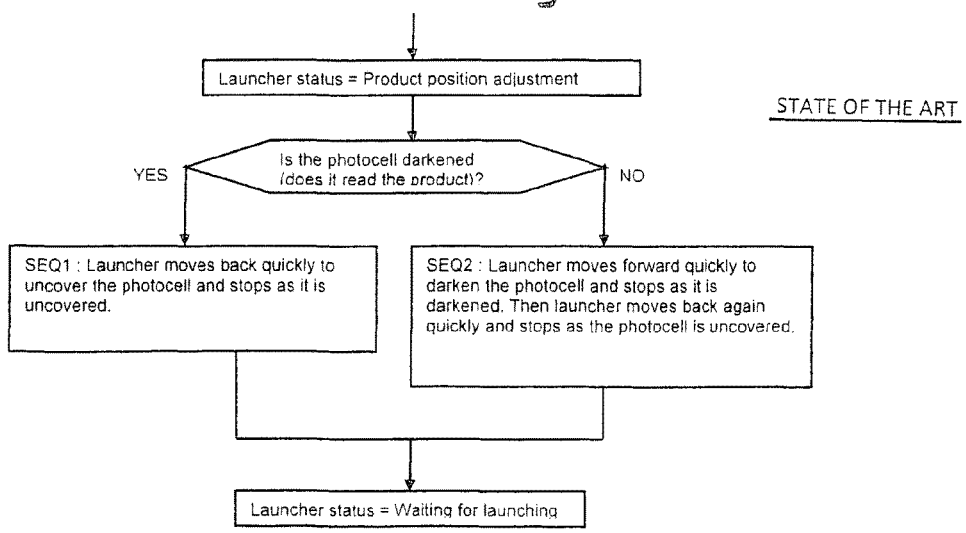
Figure 7:
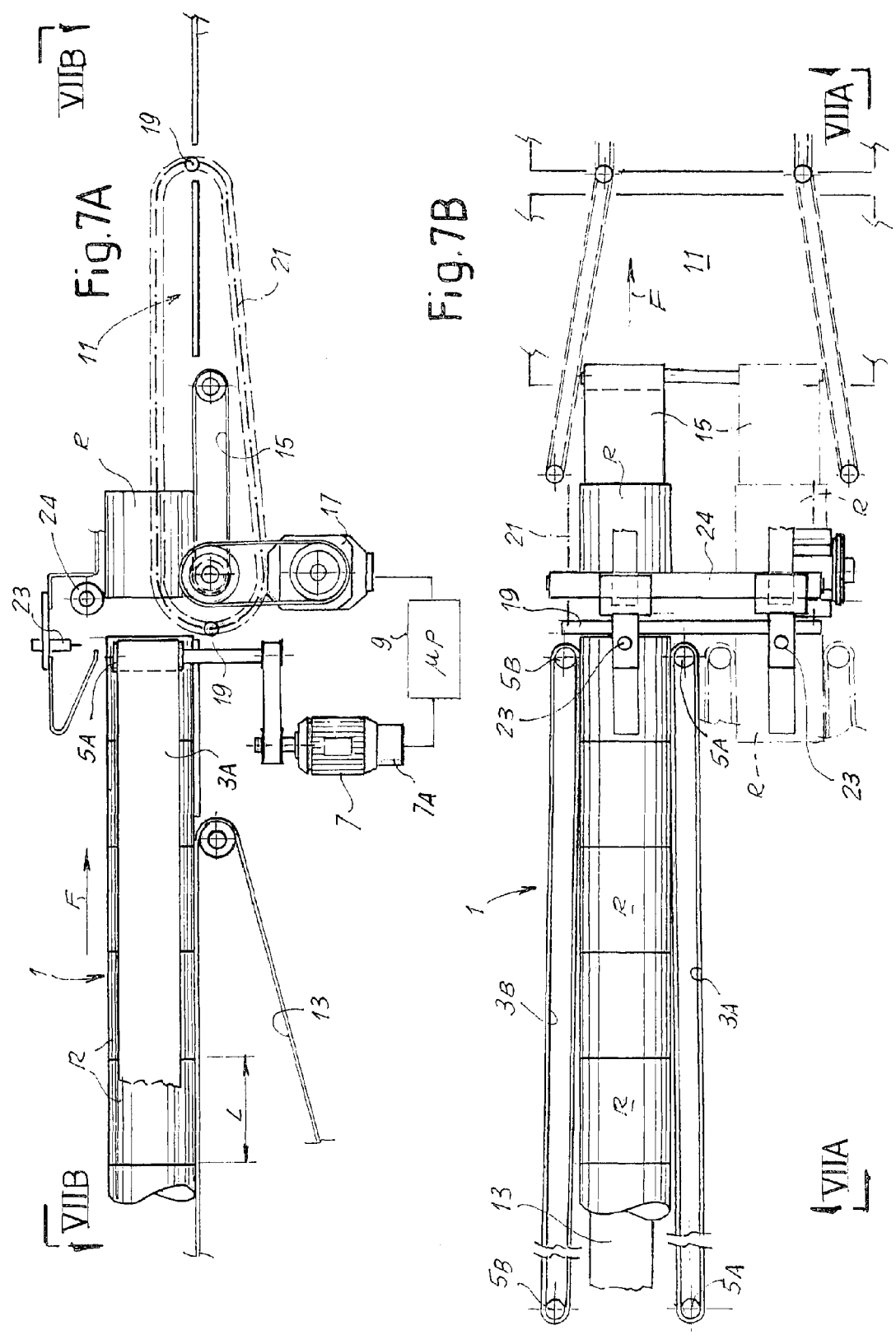
FIG. 7A shows a schematic side view of a launcher according to the invention according to the line $VII_A$-$VII_A$ of FIG. 7B.
FIG. 7B shows a plan view according to $VII_B$-$VII_B$ of FIG. 7A.

FIGS. 7A and 7B schematically show the portion of the roll processing line in correspondence of the launcher. Downstream of the launcher, that will be described hereunder, a packaging station is generally arranged, not shown and known to those skilled in the art.

In the processing line section illustrated in FIGS. 7A and 7B a so-called launcher 1 is indicated. The launcher 1 may comprise, for instance, two conveyors 3A and 3B. Each conveyor 3A, 3B may comprise for instance an endless conveyor formed by a flat belt, or a series of parallel belts. Each conveyor 3A, 3B is driven around a pair or guide rollers indicated with 5A and 5B respectively. One of the rollers 5A, 5B is motorized. In the illustrated example the rollers 5A and 5B on the right of the drawing are motorized.

In FIG. 7A number 7 indicates a motor for actuating the shafts of the motorized rollers 5A and 5B. The motor 7 is connected to a central control unit, schematically indicated with 9, that may be the master of the machine in which the launcher 1 is inserted, or a specific control unit for this section of the machine. The launcher motor 7 usually comprises an encoder 7A indicating the movements of the launcher.

The rollers 5A, 5B are preferably arranged with their axes in a vertical orientation. A space is defined between the conveyors 3A and 3B, where the rolls R, which must be launched by the launcher 1 according to the arrow F (machine direction) towards a feeding path 11 downstream of the launcher, are collected. The rolls can be launched individually or in groups, according to the type of required packaging.

In the illustrated embodiment, with the launcher 1 an accelerator conveyor 13 is associated, which can be arranged under the rolls R fed between the conveyors 3A, 3B of the launcher 1. Advantageously, the operating speed of the accelerator conveyor is a function of the speed of the conveyors 3A, 3B. In some embodiments, the speed of the accelerator conveyor 13 is constant and greater than the roll feeding speed of the launcher 1, so that the rolls upstream of the launcher 1 are adjacent to each other to form a continuous series of products, substantially without empty spaces between them. In other embodiments, as it will be better described hereunder, the speed of the accelerator conveyor 13 can be controlled taking into account the adjustments, if any, made by the launcher in subsequent launching cycles.

In some embodiments a further conveyor 15 is arranged downstream of the launcher 1. The conveyor 15 can be actuated by a motor 17. The motor 17 can also control a series of feeding bars 19 transversally mounted between support chains 21. Advantageously, the motion of the conveyor 15 and of the chains 21 with the bars 19 can be continuous and synchronized with the movement of the launcher 1. Thanks to this movement the rolls R move forward along the feeding path 11. The conveyor 15 and the support chains 21 of the bars 19 can be directly actuated by the same shaft, so that, as the guide wheels of the chains 21 have a greater diameter than that of the guide wheels of the conveyor 15, this latter moves forward at a speed slightly lower than that of the chains 21 and therefore of the bars 19.

With the launcher 1 a detection sensor is associated for detecting the presence and the passage of the rolls R. In some embodiments the detection sensor, schematically indicated with 21, is formed by one photocell or more photocells. Below reference will be made to only one photocell, being understood that also different kinds of sensors can be used alternatively, also depending upon the material of the products handled by the machine. The photocell 23 is arranged approximately in correspondence of the rollers 5A, 5B downstream of the conveyors 3A, 3B, at an adequate height to allow the rolls R to pass under the photocell 23. Advantageously, downstream of the photocell 23 with respect to the feeding direction F of the rolls R, an auxiliary motorized roller 24 is arranged, that can be driven into rotation by the same motor 17 controlling the movement of the chains 23 and of the conveyor 15. The peripheral speed of the auxiliary motorized roller 24 is preferably equal to the speed of the conveyor 15. This speed is preferably higher than the speed at which the rolls R exit from the launcher 1, so that each roll R exiting from the launcher is accelerated so as to space it from the subsequent one. This allows the photocell 23 to read the front edge, i.e. the forward edge, of each roll. As, it will be better explained below, the conveyors 3A, 3B of the launcher 1 move at a variable speed from zero to a maximum, with an acceleration and a deceleration front; in some embodiments it may be provided that the peripheral speed of the auxiliary motorized roller 24 and of the conveyor 15 are equal to the maximum speed of the conveyors 3A, 3B of the launcher 1. Vice versa, the speed of the accelerator conveyor 13 is preferably higher than the maximum speed of the conveyors 3A, 3B of the launcher 1, so that no separation occurs between adjacent rolls upstream of the launcher 1.

As schematically shown in the plan view of FIG. 7B, the conveyors 3A, 3B may be slightly convergent in the feeding direction F. Consequently, the retaining lateral pressure between the conveyors 3A, 3B and the rolls decreases from the most downstream point to the most upstream point (with respect to the feeding direction F) of the conveyors 3A, 3B to facilitate the forward push of the rolls given by the accelerator conveyor 13.

The arrangement described above may be repeated in a same machine or production line, i.e. more launchers 1 and corresponding devices associated with them can be put adjacent to one another in a direction transverse to the feeding direction F, as known to those skilled in the art. Below reference will be generically made to a single launcher, but it is understood that the line can actually have more launchers in parallel, each of which is substantially controlled in the same way.

The operation of the launcher 1 briefly described above is as follows: Each time a roll R or a group of rolls R is required in the feeding path 11, the launcher 1 performs a launching cycle. I.e. it launches the roll R (or the group of rolls) that is in the leading position between the conveyors 3A, 3B into the feeding path 11. The launching pace of the products or rolls R is controlled by the central control unit 9 and is coordinated with the operation of the machine downstream of the launcher 1, for instance a packaging machine.

Below the method for managing the launching operations of the rolls R into the feeding path 11 will be described. The method is described with general reference to the launch of single rolls, i.e. assuming that a single roll R shall be launched by the launcher 1 at every cycle. The method may be however implemented also to launch two or more rolls at every cycle. The only difference between the cycles is in the advancement length. When a single roll is launched, the launcher will perform (unless adjustments, as described below) a launch of length equal to the length of the single roll, i.e. the conveyors 3A, 3B move forward by a step equal to the length L of the single roll. Vice versa, if a number N of rolls shall be launched at every cycle, the launcher will perform an advancement by a step equal to N×L.

The machine operation is managed by the central control unit 9 according to the length L of the rolls R. The length L may be set by the operator when the machine is started, according to the dimension of the products that shall be processed in the production line. As mentioned above, a further parameter may be the number N of rolls to be launched at every cycle. As it will be better explained below, the launching length L (or N×L) can be adjusted automatically according to the data detected by the detection sensor or photocell 23 during the subsequent launching steps.

When the production starts, the positioning of the product, i.e. of the first roll R in the line with respect to the launcher photocell 23, shall be performed. The positioning is described below with specific reference to the block diagram of FIG. 8 and to the sequences schematically illustrated in FIGS. 9A and 9B.

The principle upon which the invention is based is the fact that the front edge, herein also called forward edge of the roll, i.e. the leading edge of the roll R with respect to the feeding direction F in the feeding path 11, is positioned so as to be at a preset distance P downstream of the photocell 23 (with respect to the product feeding direction F). This is the position from which the roll is "launched" into the downstream path 11. More in particular, this is defined as desired start or launch position.

Figure 8:
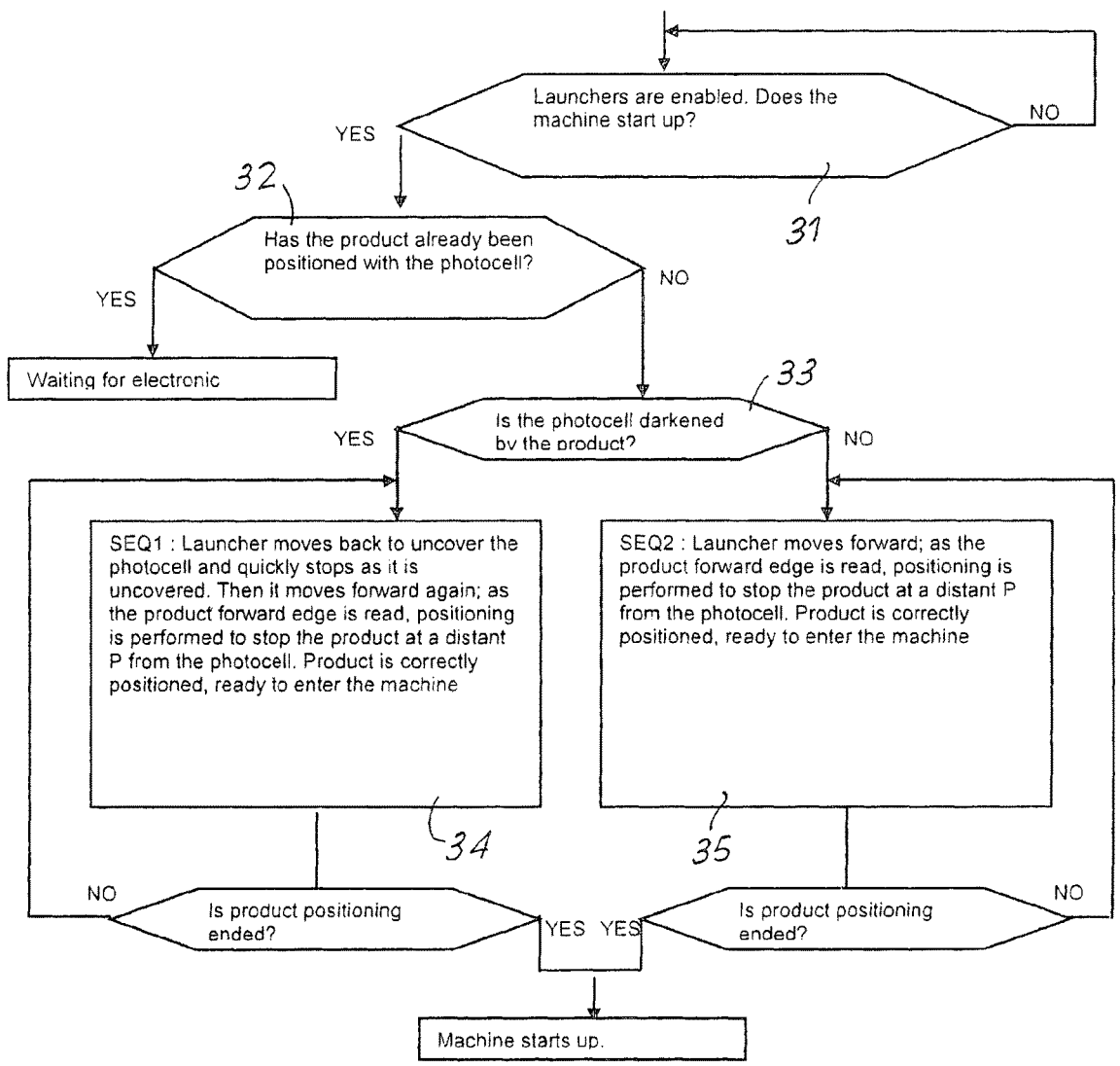
FIG. 8 shows a block diagram of the sequence for positioning the first roll at the machine start-up.

Positioning of the first roll R starts with the block 31 of the diagram of FIG. 8. This block verifies whether the machine shall be started up. If the machine is not started up, the positioning or phasing cycle interrupts, going back to the input of block 31. Vice versa, in case of output "YES" from block 31, i.e. if the machine shall be started, block 32 verifies whether the product R has been already positioned under the photocell 23, i.e. whether the positioning cycle has been already performed. If yes, the machine waits for the product launching step. If not, the presence or absence is verified of a roll in front of the photocell 23, as schematically represented in block 33 of the diagram of FIG. 8. If a roll is in front of the photocell 23, this latter is darkened (output "YES" from block 33). If no roll R is in front of the photocell 23, this latter is not darkened (output "NO" from block 33).

Depending upon the output from block 33, one or the other of the two sequences illustrated in FIGS. 9A and 9B, and summarized in blocks 34 and 35 of the diagram of FIG. 8, is actuated.

More in particular, if the photocell 23 is darkened by the roll R intersecting the optical beam thereof, the performed sequence is the one summarized in block 34 and indicated with SEQ1. This step is also schematically represented in FIG. 9A. In the first step (0) of FIG. 9A the roll R is shown darkening the photocell 23. In the subsequent step (1) the roll is moved back according to the arrow F1, i.e. it moves in a direction opposite to the feeding direction F, until the photocell 23 is uncovered, i.e. until the front or leading edge of the roll, indicated with RA in FIG. 9A, is directly upwards of the beam of the photocell 23. At this point the movement of the roll according to F1 is stopped and reversed (arrow F2) until the leading edge RA of the roll is at a distance P downstream of the photocell 23, as shown in the third step (2) of FIG. 9A. The distance P at which the front or leading edge RA of the roll is positioned may be conveniently equal to about 10 mm, more in general comprised for instance between 5 and 15 mm, these values being by way of non-limiting examples. Hereinafter this distance will be indicated as "preset distance P" and it will be assumed equal to 10 mm, just by way of example. All the roll movements are detected through the encoder 7A associated with the motor 7, assuming that there is no sliding between the conveyors 3A, 3B and the roll R and between the conveyors 3A, 3B and the motorized roller.

The encoder allows to detect the extent of the displacement of the roll R in the direction F1, up until the complete stop thereof, after the instant of detection of the passage of the roll edge RA, and therefore also the displacement occurred during the deceleration step of the motor 7. This displacement is taken into account in the subsequent step (2) of advancement according to F1 up until to achieve the distance P between the photocell 23 and the front or leading edge RA. The encoder 7A substantially "tracks" the roll actual position and allows therefore the roll to be placed highly accurately with its front or leading edge RA at the distance P from the photocell, using to this end the signal of the photocell 23 and the signal of the encoder 7A.

If the photocell 23 is not darkened by the roll R when this latter is positioned (block 35), as schematically shown in FIG. 9B, the launcher 1 imposes on the roll R a controlled forward movement according to the arrow F2 until the roll front edge RA, i.e. the leading or forward edge RA, achieves the photocell 23; the roll R is then further advanced until to be placed with its forward edge RA at the preset distance P downstream of the photocell 23 (with respect to the roll feeding direction F). In this case again the displacement is controlled through the encoder 7A of the motor 7.

In both the cases (sequence of block 34, FIG. 9A, or sequence of block 35, FIG. 9B) the first roll R of the series at the exit of the launcher 1 is therefore positioned with its front edge RA at a preset distance P downstream of the photocell 23.

In the subsequent feeding process, i.e. the process of sequentially launching the rolls R into the feeding path 11, each roll R will be initially positioned, unless positioning errors, in the same position illustrated in FIGS. 9A, 9B, with its front edge RA at the preset distance P downstream of the photocell 23.

Figure 10B:
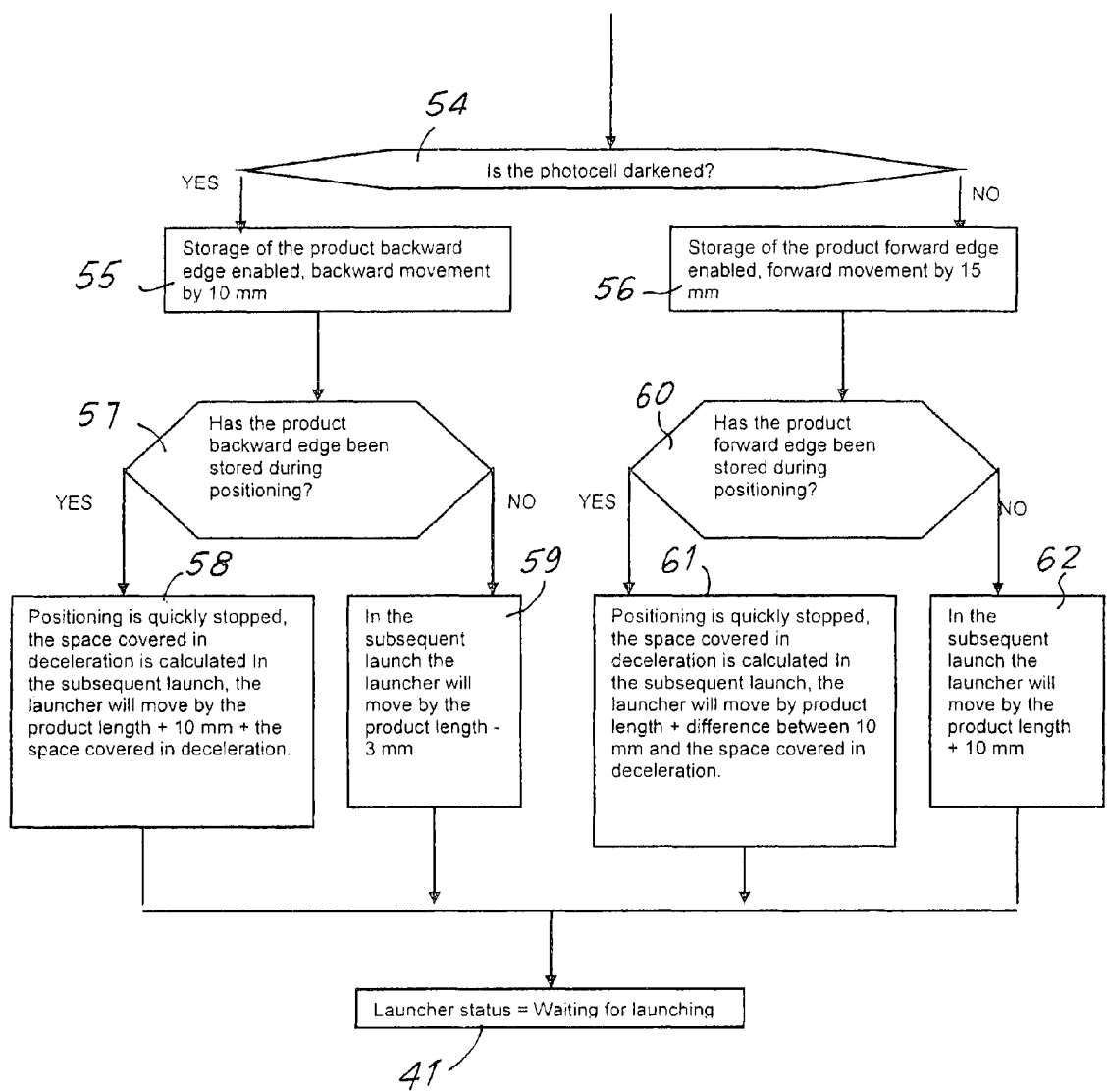

FIGS. 10A and 10B show the step of launching each roll R into the feeding path 11 and the operations, if necessary, for adjusting the position of the subsequent roll.

In block 41 the launcher is waiting for launching the new roll (or group of rolls). Block 42 verifies whether a command has been given of launching a new roll R into the feeding path 11. If no, the control goes back to block 41. If yes, the control goes to block 43.

Block 43 indicates the command of coupling the electronic cam of the launcher 1 to the machine master. Electronic cam generically means a space-time curve, electronically defining the movement over time of the launcher. Coupling of the launcher electronic cam means the phasing of the movement electronically controlled through the motor 7 and the encoder 7A with respect to the movement of the other parts of the line and in particular with respect to the movement of the bars 19 moved by the motor 17 preferably with continuous motion at constant speed. The launch shall be synchronized with the movement of the bars 19, so that the roll (or the group of rolls) is inserted on the conveyor 15 in such a position that it can be reached at the back by the bar 19, which then pushes the roll towards the downstream packaging machine (not shown). Practically, the movement of the launcher 1 shall be correctly in phase and synchronized with the movement of the corresponding bar 19, so that the bar is inserted behind the roll (or group of rolls) when this latter has been launched by the launcher between the auxiliary motorized roller 24 and the conveyor 15.

Block 44 verifies whether the electronic cam of the launcher 1 has been correctly coupled. If yes, the launch of the new roll starts (block 45). Block 46 verifies whether the launch is ended, i.e. whether the whole electronic cam of the launcher 1 has been performed. If yes, the control goes to the block 47, which verifies whether the launcher photocell 23 has stored the passage of the forwards edge RA of the roll following the roll launched. This condition is necessary in order that the launcher can launch the subsequent roll (or group of rolls).

If the forward edge of the roll following the previously launched roll (or following the last roll of the previously launched group of rolls) is not spaced from the backward edge of the last roll exiting from the launcher, the photocell 23 is not able to read the passage of the forward edge RA of the subsequent roll. When this occurs, some operations, described below, are performed.

Vice versa, if the forward edge RA of the subsequent roll has been correctly stored by the photocell 23, control goes to block 48. In this block the positioning error is calculated of the roll following the roll just launched by the launcher 1 into the feeding path 11. During launch, the launcher 1 gives the roll R a movement, according to the feeding direction F, equal to the length L of the roll itself (or of the group of rolls to be launched). The displacement is advantageously detected through the encoder 7A associated with the motor 7 of the launcher 1.

Starting from a start position in which the roll to be launched is at the preset distance P from the photocell 23 (desired start position), at the end of the launch the subsequent roll shall theoretically be positioned with its forward edge RA always at the same preset distance P from the photocell 23 and downstream of this latter, i.e. always in the desired start position. If the photocell 23 has correctly detected the forward edge of the roll following the roll just launched, based upon the signal of the photocell and the movement of the launcher detected by the encoder 7A of the motor 7 block 48 identifies the position actually reached by the front edge, called the detected start position. Based upon this data it is possible to determine the positioning error, i.e. the difference between the actual position of the forward edge RA of the roll following the roll just launched (or following the last roll of the group of rolls just launched) and the theoretical position (desired start position) that this subsequent roll should take, at the preset distance P from the photocell 23.

As it will be explained below, the adjustments differ based on the error extent and sign, i.e. if the detected start position is too much advanced or too much set back with respect to the desired start position (distance P from the photocell 23).

The error calculated in block 48 is compared with a tolerance threshold or range, for instance 3 mm in absolute value. The value of 3 mm shall be intended only as a non-limiting example. If the value is within this tolerance range, no adjustment is made and the control goes to block 50, equal to block 41.

Vice versa, if the error detected in block 48 is greater than the tolerance threshold, i.e. if the forward edge RA of the roll is out of the range of +/−3 mm from the theoretical position P, control goes to block 51 and then to blocks 52 and 53, to make the adjustment.

As it is schematically shown in block 51, if the error absolute value measured in block 48 is greater than a maximum threshold, in the example 15 mm, this error is limited to the maximum threshold of 15 mm. It should be understood that, in this case again, this value is given just by way of non-limiting example. This means that the control and adjustment system limits to 15 mm (or other maximum threshold) any errors exceeding this threshold.

Two distinct cases can then occur, i.e.:

the rolls stops before having reached the preset distance P, i.e. with its front edge RA beyond the photocell 23, but at a distance from it lower than the preset distance P. Conventionally, in this case the error has positive sign ("+") as it is defined as $E=(\text{theoretical position})-(\text{detected position});$ the roll following the roll just launched stops in a too much advanced position with respect to the theoretical position, i.e. with its edge RA downstream of the photocell 23 and at a distance from it greater than the preset distance P. Conventionally, in this case the error has negative sign ("−").

In the first case, the adjustment may be theoretically made without limits, as it only involves the advancement of the roll R until its front or forward edge RA has achieved the preset distance P downstream of the photocell 23.

Vice versa, in the second case the adjustment involves a backward movement of the roll with respect to the achieved position. This backward movement causes a negative effect on the rolls upstream of that positioned in correspondence of the photocell 23. To avoid the upstream rolls from overturning and/or to avoid an excessive stresses thereof, the adjustment is preferably subdivided. This means that the backward movement necessary for adjusting the error is not imposed all at a time to a single roll; instead, it is distributed on more subsequent rolls, so that the backward movement imposed at every launching cycle is smaller than the error. The extent of the backward movement imposed to the roll to adjust the error is for instance subdivided into two, and the adjustment is imposed in two subsequent steps: one half of the adjustment is imposed on the roll that is in launching position, and the other half on the roll following it.

Practically, according to the embodiment schematized in the diagram of FIG. 10A, the process is the following. Firstly, an error threshold shall be set, lower than the limit value (assumed in the example equal to 15 mm). This threshold will be indicated below as "delayed adjustment threshold". In the described embodiment this delayed adjustment threshold is 10 mm. In this case again said value is given just by way of non-limiting example.

If the error is comprised between −10 and −3 mm or between +3 and +10 mm, i.e. if the edge RA is positioned downstream or upstream of the theoretical point, but at a distance from it comprised between the tolerance threshold (3 mm) and the delayed adjustment threshold (10 mm), then no adjustment is performed in this cycle. The roll is launched from the position it has achieved, constituting the detected start position of the launching cycle. Adjustment is delayed until the subsequent launching cycle, and is performed forcing the motor 7, and therefore the conveyors 3A, 3B, to move the subsequent roll for an increased length. L is the nominal length of the roll (or of the group of rolls to be launched in a single cycle); the actually imposed forward movement will be therefore equal to L+Error.

If the error absolute value is greater than the delayed adjustment threshold (10 mm in the illustrated example), the adjustment is made in two different ways, depending upon whether the error is due to a too much advanced positioning (negative error) or to a much backed positioning (positive error) with respect to the theoretical position.

In the first case, a partial adjustment is made, moving back the roll. Partial adjustment means that only a part of the error is adjusted. Adjustment is subdivided because in this case the error must be adjusted by pushing back the roll that is at the exit of the launcher, to bring it again to the desired position. This backward movement is hindered by the upstream rolls R that are constantly pushed by the accelerator conveyor 13. An excessive backward movement poses the risk for the upstream rolls of being damaged or even of being overturning about a horizontal axis. However, the adjustment is not delayed to the subsequent cycle, as if the error is greater than the immediate adjustment threshold, it is highly probable that the roll at the exit of the launcher interferes through its front edge with the trajectory of the bars 19. As mentioned above, these bars move with continuous motion, and therefore a bar passes in front of the roll following the roll just launched, inserts in the feeding path, follows and reaches the roll just launched and pushes it forward. If the subsequent roll stops in a too much advanced position, the bar that shall be inserted in the feeding path interferes with this subsequent roll and can draw it in an incorrect position, causing the product flow to stop. To avoid this, the delayed adjustment threshold is defined; if this threshold is exceeded, the adjustment is not delayed to the subsequent cycle but performed immediately. The roll backward movement is advantageously equal to half the measured error, so as, on one hand, to free the path of the bars 19, and on the other hand to reduce as much as possible the negative effect due to the backward push of the upstream rolls.

Vice versa, if the calculated error is greater than the delayed adjustment threshold, but has positive sign, this means that the roll is too much upwards from the desired position (distance P of the edge RA from the photocell 23): the adjustment is performed completely, as it occurs by moving the roll forwards, without negative effects due to the backward movement of the rolls. In this case the adjustment is not delayed until the subsequent cycle, as its extent could result in the rolls reciprocally separating, with error in the subsequent positioning. Furthermore, a so great adjustment performed during the subsequent launching step could require too excessive stress on the motor 7. However, if one can accept these drawbacks, in less advantageous embodiments it is also possible that the adjustment of a positive error is always delayed until the subsequent launching cycle instead of being performed immediately, as described in the operation mode schematized in FIG. 10A and described above.

According to a further embodiment, in case of negative error (too much advanced roll), the backward adjustment movement is not equal to half the detected error, but to the difference between the detected error and the delayed adjustment threshold. The remaining adjustment can be performed at the subsequent cycle. In this way the extent is reduced of the backward movement that the roll in launching position must perform.

Once the adjustment extent has been determined, this is applied calculating (according to machine speed, error width and degrees available for the adjustment) acceleration, deceleration and movement speed in adjustment step, so as to reduce as much as possible the stresses on the upstream rolls (block 52), when the adjustment requires a backward movement of the roll. Block 53 represents the adjustment step.

The process described above is schematically illustrated in FIGS. 11A to 11H. These figures show the area corresponding to the position of the photocell 23. In the figures only the photocell 23 and the leading roll contained in the launcher 1 are shown. R1 indicates the roll to be launched and R2 the subsequent roll that, after the roll R1 has been launched, shall be positioned and then, at the subsequent launching cycle, launched into the feeding path 11. If more rolls must be launched at every cycle, the process is substantially the same, with the only difference that at each launch the launcher ejects a plurality of rolls.

Figure 11:
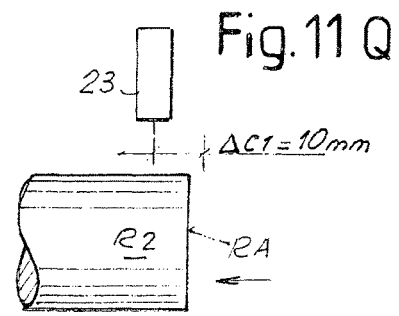
FIGS. 11A to 11T schematically show the positioning of the product according to the various sequences illustrated in the block diagram of FIGS. 10A and 10B.
Figure 11:
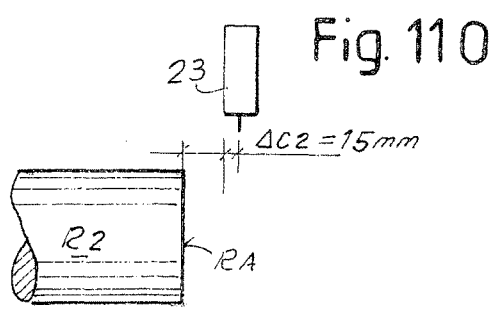
Figure 11:
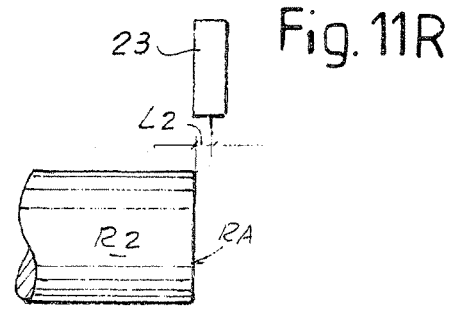
Figure 11:
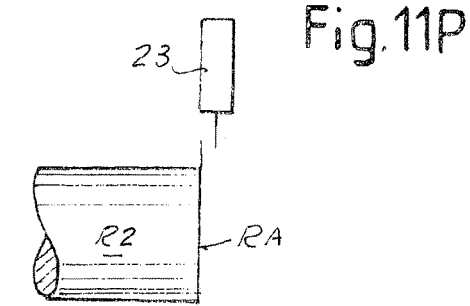
Figure 11:
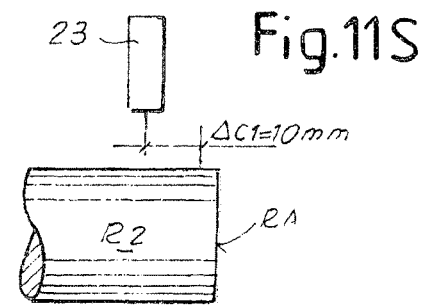
Figure 11:
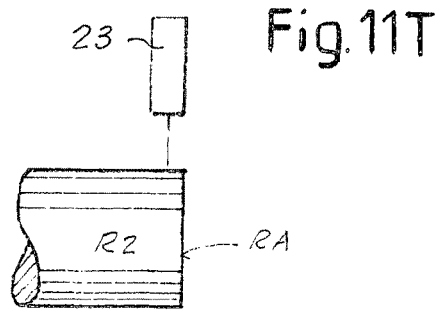

In FIG. 11A reference P indicated the distance between the front or leading edge RA of the roll R1 and the position of the photocell 23. Once the roll R1 has been launched in the feeding path 11 of the launcher 1, the subsequent roll R2 arrives under the photocell 23, see FIG. 11B. In this example it has been assumed that the front edge RA of the subsequent roll R2 is not correctly positioned at the preset distance P from the photocell 23. E indicates the positioning error. In this example, the edge RA of the roll R2 is too much back (positive error) with respect to the ideal or theoretical position it shall achieve. In this example the absolute value of error E is however lower than a tolerance value $E_T$, i.e. it is within the tolerance range or threshold. Consequently, in this case no adjustment is performed (blocks 49, 50 of FIG. 10A).

A similar situation (no adjustment) occurs when the front edge RA of the roll R2 is positioned downstream of the theoretical point (distance P from the photocell 23), but with an absolute value of the error E equal to or lower than $E_T$ with respect to the theoretical position, as shown in FIG. 11G.

In FIG. 11C the second roll R2 is positioned with its front edge RA too much backed with respect to the theoretical position (preset distance P from the photocell 23) with an absolute value of the error E greater than the tolerance threshold $E_T$, but lower than the delayed adjustment threshold, that in the example described with reference to the diagram of FIG. 10A has been set equal to 10 mm. In this case the adjustment could occur moving forward the roll R2 up until its front edge RA is in the position illustrated in FIG. 11D, i.e. at the preset distance P from the photocell 23. However, as already mentioned, with reference to the description of the diagram of FIG. 10A, in one embodiment (block 51) the adjustment is delayed until the subsequent launching step; the roll R2 is therefore launched starting from the position of FIG. 11C, but the launching length is adjusted by the calculated error and the subsequent roll, indicated with R3 in FIG. 11D, is therefore in the correct position, at the distance P from the photocell 23.

In FIG. 11E the error E is positive (roll R2 backed with respect to the preset theoretical position P) and greater than the delayed adjustment threshold. In this case, the adjustment is performed immediately, and not at the subsequent cycle, i.e. the roll R2 moves forward by the error E up until it is in the pre-set position P, as shown in FIG. 11F.

In FIGS. 11H and 11I the absolute value of the positioning error is greater than the tolerance threshold $E_T$, lower than the delayed adjustment threshold and of negative sign, i.e. with the front edge RA of the second roll R2 further advanced with respect to the theoretical launching position. In this case, as described above and indicated in the diagram of FIG. 10A, the adjustment is made at the subsequent cycle, shortening the length by which the subsequent roll R3 is moved forward. FIG. 11I shows the position of the subsequent roll R3 after the launch of the roll R2.

FIGS. 11J and 11K show the adjustment of a negative error whose absolute value is greater than the delayed adjustment threshold, set at 10 mm in the example. In FIG. 11J the roll R2 stops too much farther (error E>10 mm). The roll R2 is immediately moved back, i.e. an immediate adjustment is made, not delayed until the subsequent launching cycle. The adjustment is subdivided, i.e. the roll R2 is moved back by E/2 up until to achieve the position of FIG. 11K. From this position the roll R2 will be launched at the subsequent launching cycle.

The launch of the roll R2, which is in the position of FIG. 11K, may be performed with a launching length L equal to the nominal length of the roll R (or of the group of rolls to be launched). This allows the systems to make, if necessary, a further adjustment for absorbing the remaining error E/2 in the subsequent step, according to the criteria explained above. The system thus allows a gradual adjustment. Alternatively, it is possible to absorb the remaining error E/2 in the launching cycle of the roll R2, shortening the length of the launch (correct L=L−E/2). The first method is preferred, as it allows a more gradual adjustment and reduces instability.

The description above illustrates the operation of the device in the case in which the front edge, i.e. the leading edge RA of the roll R2, following the launched roll R1, is correctly detected by the photocell 23 and stored by the central unit to control the subsequent launch. It is however also possible that this detection does not occur; in this case from block 47 control does not go to block 48 but to block 54 (FIG. 10A).

Block 54 verifies whether the photocell 23 is darkened after the launch of the roll R1. If the photocell is darkened, this means that the subsequent roll R2 has passed beyond the photocell 23 but this latter has not detected the passage of the front edge RA thereof. This can occur, for instance, if there is no adequate space between the backward edge of the roll R1 and the front or forward edge of the roll R2.

In this case a backward movement is imposed on the roll R2, following the roll R1 just launched, i.e. a movement in the opposite direction with respect to the feeding direction F. The backward movement is equal to a first preset entity $\Delta C1$ that, in the example illustrated in the diagram of FIG. 10A (block 54A) is equal to 10 mm. This value again is given just by way of non-limiting example.

Vice versa, if the photocell 23 is not darkened, i.e. if the roll R2 has not passed beyond the photocell, a forward movement on the roll R2 of $\Delta C2$ is imposed, which in the example illustrated in the block diagram of FIG. 10A (block 54B) is equal to 15 mm. As this forward movement is concordant to the roll feeding direction, this may be greater than the backward movement imposed when the photocell is darkened, when the downstream rolls could be damaged or overturned.

Control goes to block 52, where the acceleration and deceleration values are calculated for performing the forward or backward movement; then control passes to the subsequent block as shown in FIG. 10B, which is the continuation of the block diagram of FIG. 10A and carries forward blocks 54 and 41, already visible in FIG. 10A.

The diagram of FIG. 10B details the process performed when the forwards edge of the roll R2 has not been detected. From block 54 control goes to block 55 and 56 respectively: if the photocell 23 is darkened, control goes to block 55; if the photocell 23 is not darkened control goes to block 56.

As indicated in block 55, before imposing the backward movement by 10 mm, the photocell 23 is allowed to store the product backward edge, i.e. the storage is enabled of the signal generated by the passage of the front edge RA of the roll R2 in front of the photocell 23 during the backward movement thereof. Control passes from block 55 to block 57, which verifies whether the passage of the backward edge has been detected, i.e. whether the forward edge RA of the roll R2 which was beyond the photocell 23 has passed in front of it during the backward movement of the same roll R2. If yes control passes to block 58. The backward movement is immediately stopped as the passage of the edge RA of the roll R2 is detected. The distance is calculated covered by the roll R2 during the step of moving back, including the deceleration step. When the roll R2 shall be launched into the feeding path 22, it will be translated not by a distance L equal to the roll length, but by a distance equal to the sum L+P (in the example 10 mm) increased by the distance covered during the backward and deceleration step from the instant in which the backward passage of the edge RA is detected up until the stop of the backward movement. The subsequent roll R3 (which is held by the conveyors 3A, 3B of the launcher 1, and therefore moves by the same entity as the roll R2) will be thus positioned correctly, with its edge RA at the distance P from the photocell 23 and downstream of it.

Vice versa, if block 57 detects that during the backward movement by 10 mm the passage has not been detected of the forward edge RA of the roll R2 in front of the photocell 23, the control passes to block 59. The roll R2 is stopped; at the subsequent launch it will made advance by a distance lower than the roll length, starting from the position in which it located after the adjustment (backward movement by 10 mm). In the illustrated example the length of the forward movement of the roll is decreased by 3 mm with respect to the actual length of the roll. The following roll will be therefore positioned with a lower positioning error with respect to that of the roll just launched, and could require a further adjustment cycle.

If the block 54 detects that the photocell 23 is not darkened by the product, control passes to block 56. In block 56 the storage is enabled of the product forward edge, i.e. of the passage of the edge RA of the roll R2 in front of the photocell 23, and the forward movement of the roll R2 by 15 mm is allowed, i.e. the movement according to the roll feeding direction F. If during this movement (block 60) the passage of the raising front, i.e. of the forward edge RA of the roll R2 in front of the photocell 23 is detected, the control passes to block 61: the forward movement of the roll is stopped; the space covered during the deceleration step is calculated; and the subsequent launch of the roll R2 will be performed imposing on this latter a displacement equal to the length L of the roll added to the difference between the preset length P (10 mm in the example) and subtracted from the space covered in deceleration during this adjustment step.

If at block 60 the product forward edge has not been stored during the forward movement by 15 mm, control passes to block 62; the subsequent launch of the roll R2 will cause the displacement thereof by a distance equal to the roll length L added with the preset length P (10 mm in the illustrated example).

A new adjustment process will start if the subsequent roll is still too much back.

FIGS. 11L to 11T schematically show the roll reading area in correspondence of the photocell 23 in the cases described above, wherein the photocell, during the launch of the previous product R1, has not read the leading edge of the subsequent roll R2.

More in particular FIGS. 11L, 11M and 11N show what occurs in blocks 56-61. In FIG. 11L, roll R2 is shown in the position in which it has stopped upstream of the photocell 23. The photocell 23 is therefore not darkened. A forward movement equal to $\Delta C2$=15 mm is imposed on the roll R2. In the illustrated case, the distance to be covered by roll R2 up until the front edge thereof intercepts the photocell 23 is smaller than the adjustment $\Delta C2$=15 mm. In fact, in FIG.

11M the edge RA of the roll R2 has already intercepted the photocell 23 before having completely advanced by 15 mm. In this instant the deceleration and stop step of the roll R2 starts, which ends after the roll has covered a length L1, as shown in FIG. 11N. The roll R2 will be therefore launched from this position by the launcher 1 at the subsequent launching cycle; the roll (and the subsequent roll) will cover a length equal to the roll set length L plus the preset length P (10 mm in the example) subtracted by the length L1.

In FIGS. 11O and 11P the edge RA of the roll R2 does not intercept the photocell 23, i.e. the roll R2 has been stopped so far and upstream of the photocell 23 that the distance $\Delta C2=15$ mm is not sufficient to bring it under the photocell 23. In this case the roll R2 is advanced up until the position illustrated in FIG. 11P (i.e. by $\Delta C2=15$ mm) and here it stops. At the subsequent launch the roll R2 will be advanced by the roll length L plus the preset distance P, as indicated in block 62.

In FIGS. 11Q and 11R the roll R2 has intercepted the photocell 23 and shall be therefore moved back as indicated in blocks 55, 57, 58, and 59.

In FIG. 11Q the leading edge RA of the roll R2 is arranged downstream of the photocell 23. In block 55 a backward movement by $\Delta C1=10$ mm is therefore imposed on the roll R2, as indicated by the arrow in FIG. 11Q. In this example the distance $\Delta C1=10$ mm is greater than the distance between the photocell 23 and the edge RA. During the backward movement the passage of the backward edge of the roll R2 is therefore detected and stored. The detection of the backward edge causes deceleration and stop of the roll R2, which stops with its leading edge RA at a distance L2 upstream of the photocell 23, as shown in FIG. 11R. In the subsequent launching step roll R2 will be advanced from this position by the roll length L plus the preset length P and the space L2 covered in the deceleration step (block 58).

FIGS. 11S and 11T show the front edge RA of the roll R2 stopped downstream of the photocell 23, at a distance therefrom, which is greater than the adjustment $\Delta C1=10$ mm. The photocell 23 is darkened and the backward movement therefore starts (block 55), i.e. the roll R2 will be moved backwards by $\Delta C1=10$ mm. In this case the quantity $\Delta C1$ is not sufficient to uncover the photocell 23; when the backward movement by $\Delta C1=10$ mm ends, the roll R2 is therefore in the position of FIG. 11T, with the front edge RA positioned again downstream of the photocell 23, that remains darkened. In this situation, as indicated in block 59, the subsequent launch of roll R2 will cause a forward movement of the roll R2 (and of the following roll) equal only to the roll length L.

In improved embodiments of the invention a process is also provided to control the launch efficiency. Once a roll has been launched, controls are performed in the following cases:

1) too many subsequent adjustments exceeding a maximum threshold, for instance 7 mm in absolute value;
2) too many successive non-storages of the forward edge of the roll;
3) to balance small or great average changes in the length L of the rolls entering the launcher.

Experiments have in fact proved that a correctly regulated system, as regards electronics and mechanics, with constant flow of rolls into contact one with the other, has an average positioning error of +/-2 mm, i.e. within the tolerance $E_T$ and the forward edge is stored correctly at every cycle.

When the system is not correctly regulated or the product flow is not homogeneous, the error exceeds +/-7 mm and the forward edge often is not stored; the machine therefore shuts down and a message is shown on the operator panel.

Figure 12:
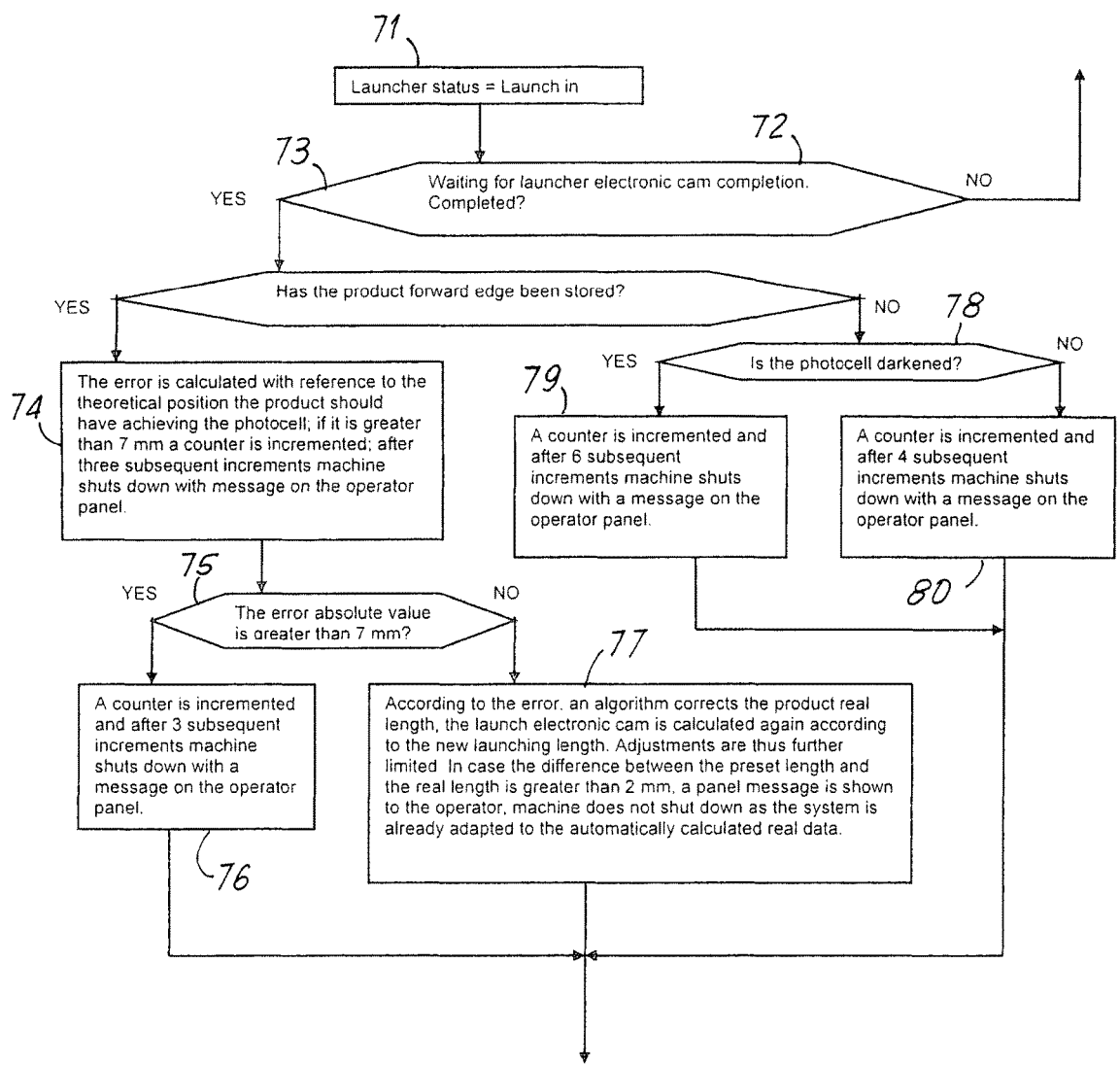
FIG. 12 shows a block diagram of the process for controlling the launch effectiveness.

Diagram in FIG. 12 schematically illustrates a possible method for performing these efficiency controls. Block 71 indicates the launching step of a roll R. Block 72 verifies whether the electronic cam of the launcher has been completely executed, i.e. the launching cycle has been completed. If the launch has been completed, control passes to block 73. This latter verifies whether the forward edge of the roll R2, following the launched roll, has been detected and stored. If yes, control passes to block 74. Here the error is calculated: if it is greater than 7 mm (or other adequately set threshold) a counter is incremented. After three subsequent counter increments, the machine is shut down and a message is shown on the operator panel. This is made from block 74 to block 75 and from this latter to block 76 if the absolute value of the calculated error is greater than 7 mm.

If from block 75 it results that the absolute value of the calculated error is lower than 7 mm, or lower than other adequately set threshold, control passes to block 77. In this block the following occurs. According to the detected error, an algorithm corrects the real length of the product R and the electronic cam of the launcher is calculated again based upon the new launching length, i.e. upon the new value L. If this calculation determines a change greater than a certain limit, 2 mm in the example, with respect to the theoretically set length L, an alarm message will be shown to the operator, however without shut down, as the machine has been automatically adapted for the new parameters. The alarm signal indicates to the operator that the machine is not correctly adjusted, for instance there are errors in the mechanical adjustment of the members thereof, or in the roll length setting. The operator can thus intervene and correct the error.

If from block it results that the forward edge of the roll R2 has not been stored, block 78 verifies whether the photocell 23 is darkened. If yes, a counter is incremented and after a certain number of subsequent increments, six in the example, the machine is shut down and a message is shown on the operator panel (block 79).

If form block 78 it results that the photocell is not darkened, a different counter is incremented and the machine is shut down after a certain number of subsequent increments, for instance four, of this other counter, and a corresponding message is shown to the operator (block 80).

Substantially, the controls schematically described in the first block of FIG. 12 provide therefore for:

alarm signal and machine shutdown if the absolute value of the roll positioning error is greater than a threshold value (7 mm in the example) for a certain number of times (three consecutive times in the illustrated example);

if the absolute value of the positioning error is lower than 7 mm, the control performs an automatic adjustment of the roll reference length L, i.e. the machine substantially adapts to small changes in the roll length with respect to the preset length;

if the system does not detect the roll forward edge for a certain number of consecutive times, the machine is shut down. In the illustrated example two different behaviors are provided (two different counters and two different limit values, respectively 6 and 4) based upon whether the photocell 23 is darkened at the end of the roll launch.

It is understood that the drawing only shows an example provided by way of a practical embodiment of the invention, which can vary in forms and arrangements without however departing from the scope of the concept underlying the invention. Any reference numbers in the appended claims are provided for the sole purpose of facilitating reading of the claims in the light of the description and the drawing, and do not in any manner limit the scope of protection represented by the claims.

The invention claimed is:

1. A method for feeding products in a feeding path through a launcher controlled by a control unit and associated with a detection sensor to detect the passage of said products, comprising steps of:
   moving forward a product according to a feeding direction beyond said detection sensor up to a detected start position;
   launching one or more products from said detected start position into said feeding path through said launcher; and
   moving forward said one or more products according to the detected start position and to a preset length of said one or more products.

2. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 1.

3. The method according to claim 1, wherein said detected start position is compared with a desired start position, at a preset distance downstream of said detection sensor; and said launcher imposes on said one or more products a forward movement corresponding to said preset length of said one or more products adjusted according to an error between the desired start position and the detected start position.

4. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 3.

5. The method according to claim 3, wherein said one or more products comprises a single product, said preset length of said one or more products corresponding to a length of said single product.

6. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 5.

7. The method according to claim 1, wherein said one or more products comprises a single product, said preset length of said one or more products corresponding to a length of said single product.

8. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 7.

9. The method according to claim 1, wherein said one or more products comprises a plurality of subsequent products aligned along the feeding direction, said preset length of said one or more products corresponding to a sum of the lengths of said plurality of subsequent products.

10. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 9.

11. The method according to claim 1, wherein when a product feeding cycle starts, a first set of said one or more products is arranged with a leading edge thereof, with respect to the feeding direction, in a desired start position downstream of said detection sensor; said first set of said one or more products and subsequent sets of said one or more products are launched in succession into said feeding path, imposing a forward movement on each of said first set and said subsequent sets according to said preset length of said one or more products, starting from said detected start position, and according to any adjustment necessary in case the detected start position differs from the desired start position.

12. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 11.

13. The method according to claim 11, wherein when feeding of the one or more products starts, before starting the launching of the one or more products into said feeding path, verification is provided as to whether a product is detected by said detection sensor; and wherein
   if a product is detected by the detection sensor, said product is moved back until said product is no longer detected by the detection sensor, then the product is stopped and moved in the feeding direction until to bring a leading edge of said product in the desired start position, at said preset distance downstream of the detection sensor;
   if the detection sensor does not detect a product, the one or more products are moved forward in the feeding direction until to bring a leading product in the desired start position, with the leading product leading edge at said preset distance downstream of the detection sensor.

14. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 13.

15. The method according to claim 1, wherein after having launched a first set of said one or more products, said detection sensor detects passage of the leading edge of a second set of said one or more products, coming after said first set of said one or more products, and a possible error is detected between the detected start position, taken by the leading edge of said second set of said one or more products, and the desired start position of said second set of said one or more products.

16. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 15.

17. The method according to claim 15, wherein in case of error exceeding a predetermined tolerance threshold, a procedure is performed for adjusting product positioning so as to bring the leading edge of a set of said one or more products at a distance from the desired start position within said tolerance threshold.

18. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 17.

19. The method according to claim 17, wherein
if the leading edge of said second set of said one or more products is in a further back position relative to the desired start position, an adjustment procedure is performed to advance the one or more products;
if the leading edge of said second set of said one or more products is in a further advanced position relative to the desired start position, an adjustment procedure is performed to back the one or more products.

20. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 19.

21. The method according claim 19, wherein if the leading edge of said second set of said one or more products is in a position which is more advanced than the desired start position and an adjustment is required, steps as follows are performed:
if error is lower than a limit value, the second set of said one or more products is backed up until the leading edge thereby is in the desired start position;
if the error is greater than said limit value, backward movement is subdivided and imposed on more sets of said one or more products launched sequentially.

22. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 21.

23. The method according to claim 19, wherein if an adjustment is required, steps as follows are performed:
if the leading edge of said second set of said one or more products is in a further advanced position with respect to the desired start position, with a positioning error lower than a delayed adjustment threshold value, a forward movement is imposed on this second set of said one or more products smaller than said preset length of said one or more products, adjusting the start position of the set of said one or more products following said second set of said one or more products;
if the leading edge of said second set of said one or more products is in a further advanced position with respect to the desired start position, with a positioning error greater than said delayed adjustment threshold value, said second set of said one or more products is moved backwards by at least one fraction of the detected positioning error before being launched into the feeding path.

24. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 23.

25. The method according to claim 19, wherein if the leading edge of said second set of said one or more products is in a further back position with respect to the desired start position with a positioning error lower than a delayed adjustment threshold value, a forward movement is imposed on said second set of said one or more products greater than the preset length of said one or more products, adjusting the start position of the set of said one or more products following said second set of said one or more products.

26. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 25.

27. The method according to claim 19, wherein if the leading edge of said second set of said one or more products is in a further back position with respect to the desired start position with a positioning error greater than a delayed adjustment threshold value, the position of said second set of said one or more products is adjusted through a forward movement up until the desired start position.

28. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 27.

29. The method according to claim 17, wherein if the leading edge of said second set of said one or more products is in a further advanced or backed position relative to the desired start position, but within a tolerance range, said adjustment procedure is not performed.

30. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 29.

31. The method according to claim 15, wherein if the leading edge of the second set of said one or more products is not detected by said detection sensor, operations as follows are performed:
- if the detection sensor detects a product, a back movement by a first preset adjustment distance is imposed on the second set of said one or more products;
- if the detection sensor does not detect a product, a forward movement by a second preset adjustment distance is imposed on the second set of said one or more products.

32. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 31.

33. The method according to claim 31, wherein the second preset adjustment distance is greater than the first preset adjustment distance.

34. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 33.

35. The method according to claim 31, wherein if a backward movement is imposed upon the product, during the backward movement verification is provided as to whether the detection sensor detects passage of the leading edge of the product; and wherein:
- if the detection sensor detects the passage of the leading edge during the backward movement, the backward movement is stopped and in the subsequent launching operation the second set of said one or more products is moved forward by a length greater than the preset length of said one or more products;
- if the detection sensor does not detect the passage of the leading edge, in the subsequent launching operation the second set of said one or more products is moved forward by a length lower than the preset length of said one or more products.

36. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 35.

37. The method according to claim 31, wherein, if a forward movement is imposed on the second set of said one or more products, during this forward movement verification is provided as to whether the leading edge of the second set of said one or more products is detected by the detection sensor; and wherein
- if the detection sensor detects the passage of the leading edge of the second set of said one or more products, in a subsequent launching step said second set of said one or more products is moved forward by a distance greater than the preset length of said one or more products, so as to bring in the desired start position the set of said one or more products following the second set of said one or more products;
- if the detection sensor does not detect the passage of the leading edge of the second set of said one or more products, the second set of said one or more products is launched with a displacement equal to the preset length of said one or more products plus said preset distance.

38. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 37.

39. The method according to claim 1, further comprising generating an alarm condition when the product detected position differs from the desired position by more than a limit value for a number of times exceeding a preset number.

40. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 39.

41. The method according to claim 1, wherein said detected start position is detected through said detection sensor and an encoder associated with said launcher.

42. A device for launching products into a feeding path, comprising: a launcher; a detection sensor to detect passage of products launched by said launcher; a launcher central control unit; conveyors to move forward products in said feeding path, associated with a drive member; and at least one movement sensor to detect position of the products moved by said conveyors; wherein said central control unit is programmed to perform a method according to claim 41.

* * * * *